United States Patent [19]

Pasaran Sayago et al.

[11] Patent Number: 5,393,377
[45] Date of Patent: Feb. 28, 1995

[54] METHOD OF ETCHING STONE MATERIALS

[76] Inventors: Ricardo Pasaran Sayago; Benigno Pasaran Sayago, both of Palmarola No. 74 Col. Zacahuizco, Mexico City, The Federal District, Mexico

[21] Appl. No.: 192,221

[22] Filed: Feb. 3, 1994

[51] Int. Cl.⁶ .................................................. B44C 1/22
[52] U.S. Cl. .................. 156/659.1; 156/654; 252/79.2; 252/79.3; 252/79.5
[58] Field of Search ............ 156/654, 659.1, 660, 156/661.1; 252/79.1, 79.2, 79.3, 79.4, 79.5; 428/3, 156

[56] References Cited

U.S. PATENT DOCUMENTS

| | | | |
|---|---|---|---|
| 437,306 | 9/1890 | Kraupa et al. | 156/659.1 |
| 5,273,620 | 12/1993 | Lamberti | 156/630 |

*Primary Examiner*—William Powell
*Attorney, Agent, or Firm*—Pennie & Edmonds

[57] ABSTRACT

The present invention relates to an improved method of engraving stone which comprises the steps of; applying to a stone material an acid resistant polymer or lacquer coating upon portions of said stone material that are not to be engraved; bathing the coated stone material with a sufficient amount of acid for a sufficient period of time to engrave said stone material; washing the stone material with a sufficient amount of base to neutralize the acid; and, removing the coating to obtain an engraved stone material.

In particular the present invention relates to methods of engraving marble or onyx using nitric acid, hydrochloric acid or hydrofluoric acids.

18 Claims, No Drawings

METHOD OF ETCHING STONE MATERIALS

BACKGROUND OF THE INVENTION

Numerous methods of etching, engraving or incising stone materials are known. Prior art methods of engraving can result in differences in the quality of the final stone product depending upon the skill of the person performing the etching, engraving or incising. For example, when chiseling a complex design or small letters in a stone material a wide variety of results are possible depending on the experience and talent of the artisan. Recently, engraving methods using suspensions of sand in pressurized air have been developed which enable more skillful and efficient etching of stone. However, there still exists a need for a process which allows detailed etching and engraving of stone materials.

SUMMARY OF THE INVENTION

The present invention relates to an improved method of engraving stone which comprises the steps of; applying to a stone material an acid resistant polymer or lacquer coating upon portions of said stone material that are not to be engraved; bathing the coated stone material with a sufficient amount of acid for a sufficient period of time to engrave said stone material; washing the stone material with a sufficient amount of base to neutralize the acid; and, removing the coating to obtain an engraved stone material.

In particular the present invention relates to methods of engraving marble or onyx using nitric acid, hydrochloric acid or hydrofluoric acids.

DETAILED DESCRIPTION OF THE INVENTION

For the purposes of this invention the term stone material is considered to mean any hard, solid, nonmetallic, inorganic mineral matter of which rock is composed. This term is meant to include both igneous and sedimentary rock.

According to the present invention a novel method is described in which a stone material is etched or engraved with a fineness and detail that has not been previously possible. In particular, it is possible to use the method of the present invention to etch, for example, small letters or artistic photographs upon a stone material.

The process of the present invention may be used to etch or engrave any type of stone material. It is preferred however to etch stone materials that can accept a high degree of polish. The most preferred materials include marble or onyx.

The first step of the process involves the coating of those portions of a stone material which will not be etched with acid. Any coating composition that will be at least partially resistant to the acid used in the etching of the stone material may be used. This first step may be preceded by other steps such as cleaning or polishing the stone material. Any treatment of the stone material which can lead to an improved result using the present invention may be performed prior to the first step enumerated above.

The coating composition can comprise any material, such as for instance, a lacquer or an organic polymer coating. The lacquer or polymer can be any that is resistant to the acids that are used in the etching of the stone material. It is preferred that the coating have an adhesiveness which, after being exposed to an acid and then a base, is less than the hardness of the stone material. Such compounds can include, for example cellulose derived materials, such as for example, nitrocellulose, butyl cellosolve, aromatic napthas with a low boiling point, such as Aromina 100 or mixtures of such ingredients. Other ingredients may also be included in the coating composition. Such additives may include for instance, hardeners, plasticizers, binders, solvents, fixers, fillers, adhesives, or the like. In a preferred mode a plasticizer is added to the coating composition.

The coating composition can be applied by any method known to those of ordinary skill in the art. Such methods would include for instance, serigraphic methods, painting, silk screening or the like. In a preferred method of carrying out the method of the present invention a serigraphic method is used to coat the stone material to be etched.

Once the coating composition has been applied to the stone material, the coating composition can be polymerized if such a step is desired or necessary for a particular coating composition.

Stone material so coated can then be bathed with an acid solution to etch or engrave those portions of the stone material that are not protected with said coating composition. The acid used can be any inorganic acid that will effectively etch the particular stone material employed. In a preferred embodiment of the present invention either nitric acid, hydrochloric acid or hydrofluoric acid will be used.

The concentration of the acid used may vary depending on how quickly any specific concentration will etch a particular variety of stone material. The concentration may also be based on the time period in which a specific acid will etch a given stone material and upon the depth to which the stone is to be etched. When nitric acid is employed a concentration of from about 20% to about 30% is preferred. Hydrochloric acid is preferred to be used in a concentration of from about 30% to about 60%. Concentrations of hydrofluoric acid of from about 5% to about 20% are also preferred.

The time period that the stone material will be exposed to said acid may vary depending on the desired etching effect, the particular acid used, and the stone material to be etched as well as other factors known to one of ordinary skill in the art. It is possible to vary the parameters upon which the time is dependant to employ time periods of from about five minutes to about 1 hour to provide an efficient etching process. The most preferable time periods are from about 15 to 20 minutes.

Once the stone material has been etched to the desired degree, the stone material is washed with a base to neutralize acid remaining on the stone surface. The base may be any type of base which will neutralize the acid used in the etching step. It is preferred, however, to use an hydroxide, a carbonate or a sulfite, or more preferably an alkali metal hydroxide, carbonate or sulfite. The most preferred basic material is a solution of sodium bisulfite.

The stone material can then be left to dry. It is contemplated that drying may be accomplished in different ways depending on the time period in which the stone material is to be completed. It is possible to dry the stone material more quickly using heat or forced air, using for example, an oven or fan respectively.

Any residual coating composition can be removed from the stone surface. This may be accomplished using any process known to those skilled in the art. Examples of suitable methods include using a brush, an abrasive, a solvent, heat, flame, or a corrosive. A preferred method of removing the coating is by manually brushing off said coating.

Said stone materials may be used with or without a decorative coating. The present invention contemplates the coating of etched or unetched portions of the stone material with decorative coatings. Such coatings may include for example paints, glazes, epoxy or aniline enamels, or the like. Epoxy and aniline enamels are preferred.

Such decorative coatings may be applied by painting, injection, aspersion or any other method known to those skilled in the art. Preferred methods include injection and aspersion.

EXAMPLES

In order to exemplify the results achieved using the stone etching method of the present invention, the following examples are provided without any intent to limit the scope of the instant invention to the discussion therein, all parts and percentages are by weight unless otherwise indicated.

EXAMPLE I

A solution comprising nitrocellulose, Aromina 100, butyl cellosolve and plasticizer concentrate is applied to several slabs of marble to form patterns on said slabs. The nitrocellulose composition is polymerized. Each slab is bathed in a separate acid solution wherein each solution has a different acid concentration of from between about 30% to 60% of hydrochloric acid. The slabs were bathed in the acid solutions for different periods of time depending on the depth of etching that is desired. Each slab is washed with an aqueous solution of sodium bisulfite until all of the acid has been neutralized. Each slab is dried and the polymer pattern is removed from the unetched portions using a brush.

EXAMPLE II

A solution of nitrocellulose, Aromina 100, butyl cellosolve and plasticizer concentrate is applied to several slabs of onyx to form patterns on said slabs. The nitrocellulose composition is polymerized. Each slab is bathed in a separate acid solution wherein each solution has a different acid concentration of from between about 20% to 30% of nitric acid. The slabs are bathed in the acid solutions for different periods of time depending on the depth of etching that is desired. Each slab is washed with an aqueous solution of sodium bisulfite until all of the acid has been neutralized. Each slab is dried and the polymer pattern is removed from the unetched portions using a brush.

EXAMPLE III

A solution of nitrocellulose, Aromina 100, butyl cellosolve and plasticizer concentrate is applied to several slabs of marble to form patterns on said slabs. The nitrocellulose composition is polymerized. Each slab is bathed in a separate acid solution wherein each solution has a different acid concentration of from between about 5% to 20% of hydrofluoric acid. The slabs are bathed in the acid solutions for different periods of time depending on the depth of etching that is desired. Each slab is washed with an aqueous solution of sodium bisulfite until all of the acid has been neutralized. Each slab is dried and the polymer pattern is removed using a brush. The etched portions of the slabs are then coated with epoxy and aniline enamels.

The scope of the following claims is intended to encompass all obvious changes in the details, materials, and arrangement of parts that will occur to one of ordinary skill in the art.

We claim:

1. A method of engraving a stone material which comprises the steps of:
   a) applying an acid resistant coating to portions of a stone material that are not to be engraved;
   b) bathing the coated stone material with a sufficient amount of acid for a sufficient period of time to engrave said stone material;
   c) washing the stone material with a sufficient amount of a base to neutralize the acid; and
   d) removing the coating to obtain an engraved stone material.

2. A method according to claim 1 which further comprises selecting the coating from the group consisting of lacquers and organic polymers.

3. A method according to claim 1 which further comprises polymerizing the coating after it has been applied to the stone material.

4. A method according to claim 1 which further comprises selecting said acid from the group consisting of nitric acid, hydrochloric acid and hydrofluoric acid.

5. A method according to claim 4 wherein said acid is nitric acid in a concentration of from about 20% to about 30%.

6. A method according to claim 4 wherein said acid is hydrochloric acid in a concentration of from about 30% to about 60%.

7. A method according to claim 4 wherein said acid is hydrofluoric acid in a concentration of from about 5% to about 20%.

8. A method according to claim 4 wherein the acid contacts the stone material for a period of time from about 5 minutes to about 1 hour.

9. A method according to claim 8 wherein the acid contacts the stone material for a period of time of from about 15 minutes to about 20 minutes.

10. A method according to claim 1 wherein the stone material is washed with a solution of a basic material.

11. A method according to claim 10 wherein said basic material is selected the group consisting of hydroxides, carbonates and sulfites.

12. A method according to claim 11 wherein said basic material is selected from the group consisting of alkali-metal hydroxides, carbonates and sulfites.

13. A method according to claim 1 wherein the coating is removed using a brush, an abrasive, a solvent, flame or a corrosive.

14. A method of engraving a marble material which comprises the steps of:
   a) applying to the marble material an acid resistant coating composition comprising nitrocellulose, a mixture of aromatic napthas and a plasticizer upon portions of said stone material that are not to be engraved;
   b) bathing the coated marble material with a sufficient amount of an acid selected from the group consisting of nitric acid, hydrochloric acid, and hydrofluoric acid for a sufficient period of time to engrave said marble material;
   c) washing said marble material with a sufficient amount of sodium bisulfite to neutralize the acid; and d) removing the coating to obtain an engraved marble material.

15. A method of engraving an onyx material which comprises the steps of:
   a) applying to the onyx material an acid resistant coating a composition comprising nitrocellulose, a mixture of aromatic napthas and a plasticizer upon portions of said onyx material that are not to be engraved;
   b) bathing the coated onyx material with a sufficient amount of an acid selected from the group consisting of nitric acid, hydrochloric acid, and hydrofluoric acid for a sufficient period of time to engrave said onyx;
   c) washing said marble material with a sufficient amount of sodium bisulfite to neutralize the acid; and,
   d) removing the coating to obtain an engraved onyx material.

16. An engraved stone material made by a method which comprises the steps of;
   a) applying an acid resistant polymer or lacquer coating to portions of a stone material that are not to be engraved;
   b) bathing the coated stone material with a sufficient amount of acid for a sufficient period of time to engrave said stone material;
   c) washing the stone material with a sufficient amount of a base to neutralize the acid; and
   d) removing the coating to obtain an engraved stone material.

17. An engraved stone material according to claim 16 which further comprises a decorative coating over some portion of the stone material which has been engraved.

18. An engraved stone material according to claim 17 which further comprises a decorative coating comprising an enamel over some portion of the stone material which has been engraved.

* * * * *